United States Patent [19]

Bartelink

[11] 3,917,907

[45] Nov. 4, 1975

[54] METHODS AND APPARATUS FOR 4-WIRE SWITCHING

[75] Inventor: Everhard H. B. Bartelink, Concord, N.H.

[73] Assignee: Northeast Electronics Corporation, Concord, N.H.

[22] Filed: Jan. 12, 1971

[21] Appl. No.: 105,817

[52] U.S. Cl. .......................... 179/18 AF; 179/2.5 R

[51] Int. Cl.[2] .......................................... H04M 1/78

[58] Field of Search ........ 179/18 AF, 16 EC, 2.5 R, 179/2.5 A, 170 D

[56] References Cited

UNITED STATES PATENTS

| | | | |
|---|---|---|---|
| 2,260,269 | 10/1941 | Wiessner | 179/2.5 R |
| 2,857,464 | 10/1958 | Singer | 179/2.5 R |
| 3,501,591 | 3/1970 | Krasin et al. | 179/2.5 R |
| 3,588,361 | 6/1971 | Hurault | 179/2.5 R |

*Primary Examiner*—Thomas W. Brown
*Attorney, Agent, or Firm*—Raymond J. McElhannon, Esq.

[57] ABSTRACT

For the purpose of establishing effective 4-wire communication over a 2-wire circuit, particularly a 2-wire switching circuit, between two 4-wire circuits, adapter circuits are inserted between each of the terminals of the 4-wire circuits and their associated 4-wire terminal sets on both sides of the 2-wire circuit. When two so adapted 4-wire circuits are interconnected by the 2-wire circuit, the adapters upon completion of a call automatically insert a local carrier modulator on one side and a local carrier demodulator on the other side of the 2-wire circuit for the traffic flowing from the call originating side to the destination side. The reverse direction traffic is handled in conventional manner. Tone signals are used by the adapters to identify adapted circuits and the local modulators and demodulators are inserted in the circuit only when two adapted 4-wire circuits are interconnected. In a modification, the adapters are activated only if a separate tone signal is received from the ultimate call destination point.

23 Claims, 6 Drawing Figures

INVENTOR
EVERHARD H. B. BARTELINK
BY
Ward, Mc Elhannon, Brooks + Fitzpatrick
ATTORNEYS INVENTOR
EVERHARD H. B. BARTELINK
BY
Ward, McElhannon, Brooks & Fitzpatrick
ATTORNEYS INVENTOR
EVERHARD H. B. BARTELINK
BY
Ward, Mc Elhannon, Brooks + Fitzpatrick
ATTORNEYS

METHODS AND APPARATUS FOR 4-WIRE SWITCHING

DISCLOSURE

This invention pertains to electrical communication systems, and provides apparatus and methods for automatically establishing 4-wire operation through a 2-wire communication circuit, such as a conventional 2-wire central office telephone switching circuit, upon interconnection thereof between a pair of 4-wire circuits.

The requirement of transmitting voice and other signals over long distances generally leads to the use of some form of "carrier" or other "4-wire" type of transmission. The designation "4-wire" applies to circuits having a separate pair of wires or their equivalent for each direction of transmission between opposite end terminals or subscribers. Circuits of the 4-wire type can readily be provided for fixed or "point-to-point" installations. However, the largest part of the current telephone network is based on circuits which are switched at one or several points to complete a call from an originating subscriber to the desired destination. While 4-wire switching is provided in some offices, such as "regional" offices, a very large part of the switching operations in the telephone system is performed by existing "2-wire" switching equipment. Matching the aforementioned carrier systems to existing 2-wire switching equipment and other networks requires a high degree of impedance uniformity in these networks and in the switching equipment to permit the use of a single "compromise" type of balancing network while maintaining an acceptable degree of "balance" in the "hybrid circuits" (also called "4-wire Termination Sets" or "4-wire Term Sets") which terminate the carrier systems. Maintaining a high degree of balance is also referred to as maintaining a high value of the "return loss" on the circuit. If this high degree of balance cannot be maintained, it is necessary to increase the effective loss in the long distance carrier systems in order to prevent oscillations, also referred to as "singing" or to prevent objectionable echo effects or distortion of the transmitted signals.

It is completely impractical to contemplate replacing the existing 2-wire switching equipment, and it is even dubious that providing 4-wire switching for all new local telephone exchanges can currently be justified. Thus, the existing switching equipment and local networks form a barrier to the establishment of a 4-wire switchable network.

With present equipment it is not possible to interconnect a series of separate 4-wire circuits by intervening 2-wire switching networks without developing observable distortion. Thus, the flexibility of existing networks using 2-wire switching equipment is somewhat restricted.

It is, therefore, an object of the present invention to provide apparatus which may be connected to the terminals of the 4-wire circuits which, when two such 4-wire circuits are interconnected by a 2-wire switching network, automatically modifies the circuitry to provide for effective 4-wire transmission over the 2-wire circuit. Providing for effective 4-wire transmission substantially increases the "return loss" from the present general level which is of the order of 27 db. With the increased "return loss," it is possible to interconnect a greater number of 4-wire circuits through intervening 2-wire switch points without introducing excessive distortion.

In accordance with one aspect of the invention, an adapter is provided for installation between a 4-wire communication circuit and a 2-wire telephone switching network which comprises: an outgoing call section for transmitting intelligence signals in the receiving path of the 4-wire communication circuit on a local carrier through the 2-wire telephone switching circuit, an incoming call section for recovering intelligence signals from a local carrier wave transmitted to the sending path of the 4-wire communication circuit from the 2-wire telephone switching network, and call mode control circuit means responsive to signals indicative of the direction of a call for connecting the outgoing or incoming call section between the 4-wire communication circuit and the 2-wire telephone switching network, respectively, when a call proceeds from or to the 4-wire circuit to or from the 2-wire network.

In accordance with a further aspect of the invention, there is provided a method of providing effective 4-wire operation through a 2-wire communication circuit interconnecting the respective sending and receiving paths of two 4-wire communication circuits comprising: modulating on a local carrier wave the intelligence signal in the receiving path of one of the 4-wire communication circuits to provide a carrier wave signal, passing the carrier wave signal through the 2-wire communication circuit to the corresponding sending path of the other of the 4-wire communication circuits, demodulating the carrier wave signal in the sending path of the other 4-wire communication circuit to recover the intelligence signal, and passing the intelligence signal in the receiving path of the other 4-wire communication circuit directly through the 2-wire communication circuit to the corresponding sending path of the one 4-wire communication circuits.

The invention will be better understood from the following detailed description of the presently preferred embodiments thereof with reference to the appended drawings in which.

The same reference numerals are used throughout the figures of the drawings to designate the same or similar parts.

Figure 1:
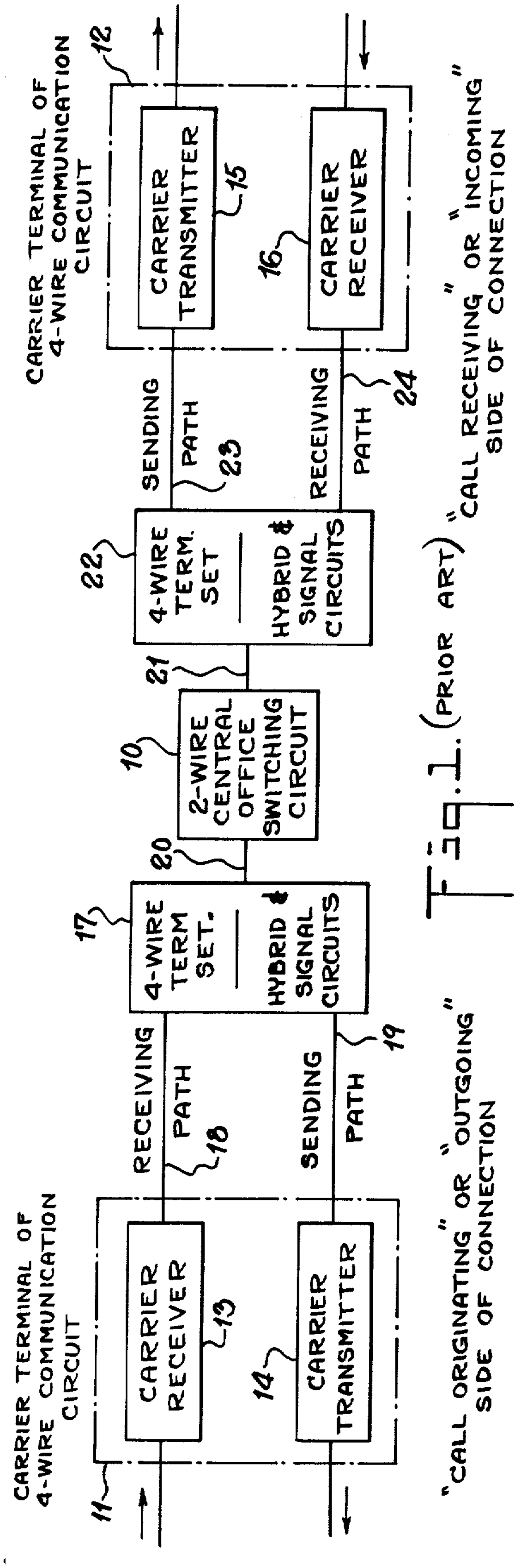
FIG. 1 is a block diagram showing the conventional prior art arrangement for interconnection of a pair of 4-wire circuits by a two wire central office switching circuit.

Referring now to FIG. 1, there is shown a communication link comprising a 2-wire communication circuit in the form of a 2-wire central office switching circuit 10 interconnecting the respective sending and receiving paths of two 4-wire communication circuits represented by the carrier terminals 11 and 12. As shown, the carrier terminal 11 includes a carrier receiver 13 and a carrier transmitter 14. In similar manner the terminal 12 includes a carrier transmitter 15 and a carrier receiver 16. The carrier receivers 13 and 16, and transmitters 14 and 15, are constructed in known manner. They may handle a plurality of channels; however, we are concerned here with a single channel demodulated by the respective receivers and applied to the individual receiving paths for transmission to the opposite sending paths.

A conventional 4-wire terminal set 17, including hybrid and signal circuits, connects the receiving path 18 from receiver 13 and sending path 19 leading to transmitter 14 with the 2-wire path 20 leading to the central office switching circuit 10. On the other side of the switching circuit 10 a path 21 leads to a second 4-wire terminal set 22 establishing connection through the sending path 23 to transmitter 15 and over receiving path 24 with receiver 16. In known manner communication from terminal 11 to terminal 12, in that direction, will take place from receiver 13 over path 18 and through 4-wire terminal set 17, path 20, central office switching circuit 10, path 21, 4-wire terminal set 22, and path 23 to transmitter 15 for application to the outgoing communication circuit. Communication in the reverse direction will proceed from receiver 16 via receiving path 24, 4-wire terminal set 22, path 21, switching circuit 10, path 20, 4-wire terminal set 17, and sending path 19 to transmitter 14 for application to the outgoing circuit.

In the circuit shown in FIG. 1, it is not possible to obtain precise balance by way of the 4-wire terminal set between the 4-wire circuit and the 2-wire circuit. Hence, some of the signal appearing on receiving path 18 will be fed back via path 19. Similarly, slight feedback will result between paths 24 and 23. It is this imperfect operation of the hybrid circuits that presently limits the performance of networks in which 4-wire circuits are interconnected through 2-wire switching points.

Figure 2:
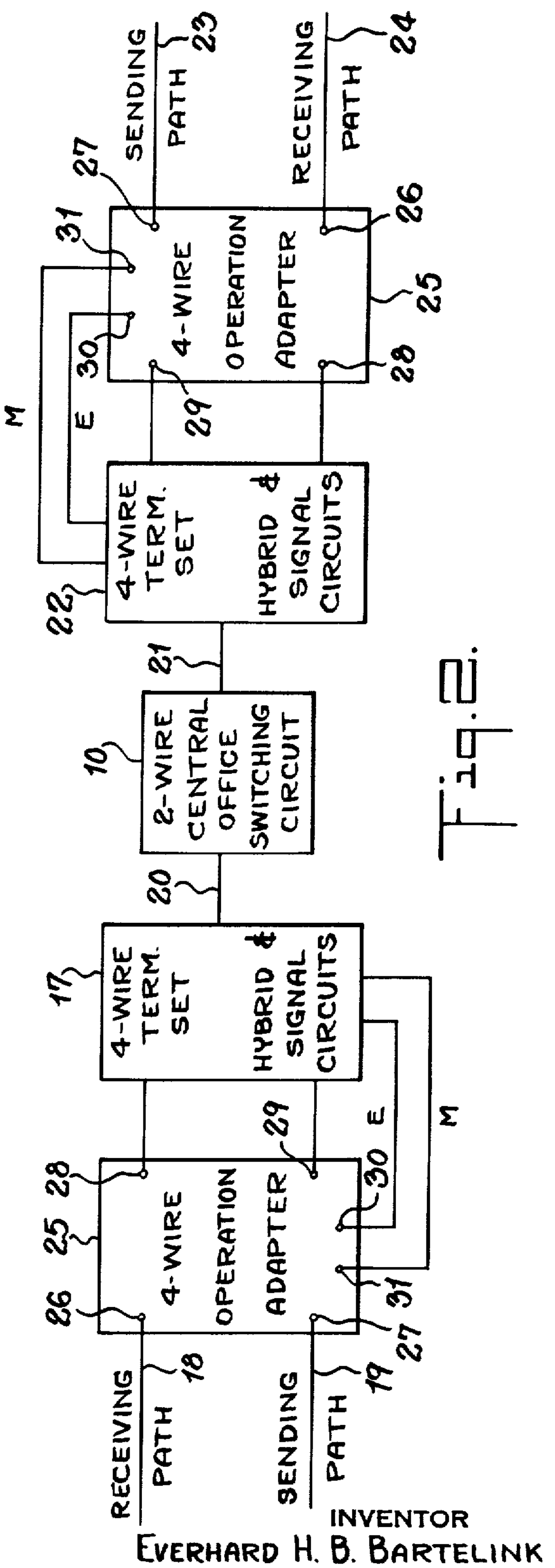
FIG. 2 is a block diagram showing the application of the adapters constructed in accordance with this invention as applied to the circuit of FIG. 1.

Referring now to FIG. 2, there is shown inserted between the paths 18 and 19, on the one hand, and the 4-wire terminal set 17, a 4-wire operation adapter 25. For purpose of identification it will be noted that the adapter 25 has a terminal 26 connected to the receiving path 18, a terminal 27 connected to the sending path 19, a terminal 28 connected to the receiving side of the 4-wire terminal set 17, and a terminal 29 connected to the send side of the 4-wire terminal set 17. In addition, the adapter 25 has two terminals 30 and 31 which are connected, respectively, to the E lead and the M lead coming from the signal circuits in the 4-wire terminal set 17.

An identical 4-wire operation adapter 25 is connected in precisely the same manner between the receiving and sending paths 24 and 23, on the one hand, and the 4-wire terminal set 22. The assumption in FIG. 2 is that the central office switching circuit 10 has interconnected two 4-wire circuits each of which has been equipped with an adapter 25.

Figure 3:
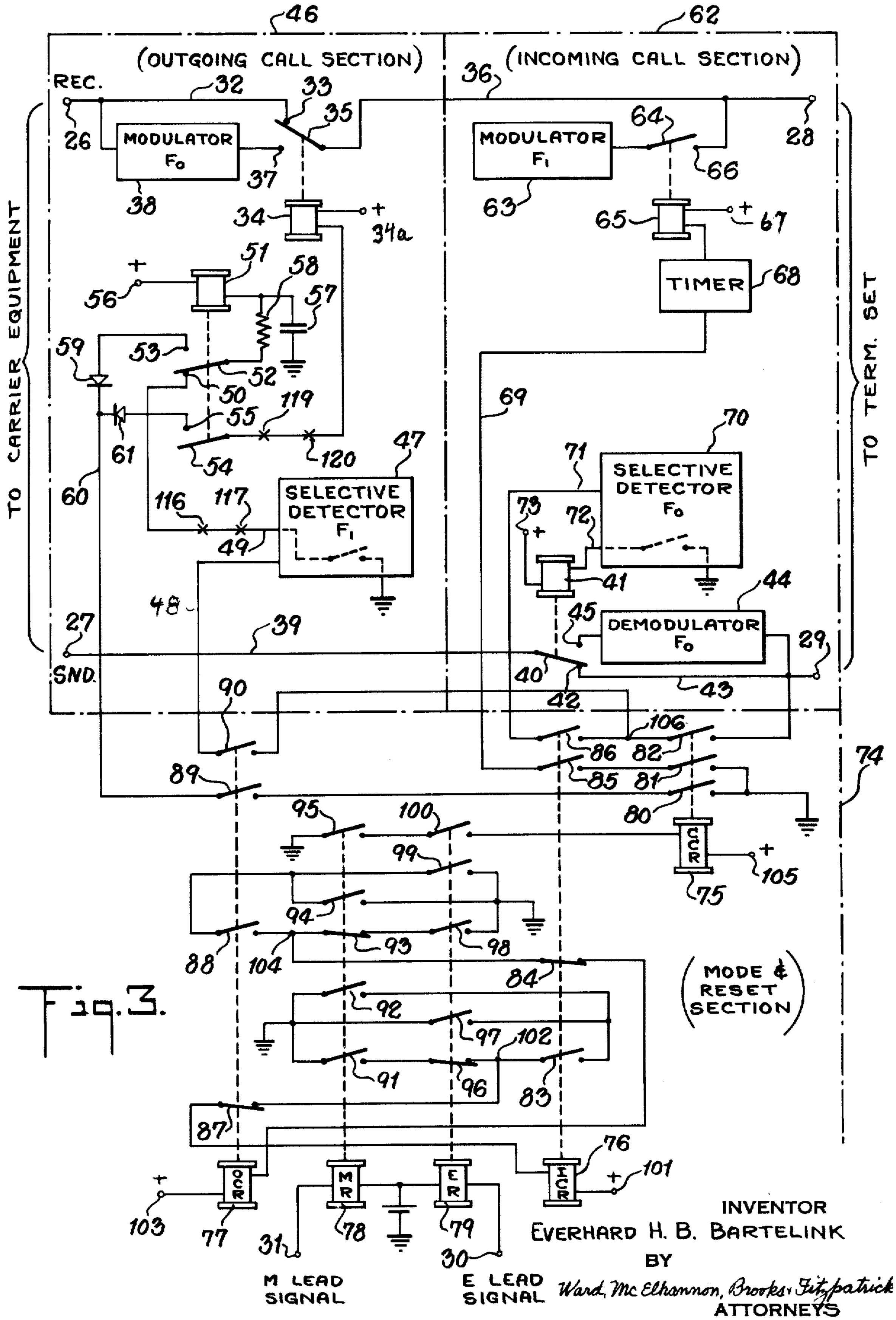
FIG. 3 is a schematic diagram of the 4-wire operation adapters used in the circuit of FIG. 2.

The details of construction of the adapter 25 are shown in FIG. 3 to which attention is now directed. Terminal 26 of the adapter is connected over a lead 32 to a fixed contact 33 of a relay 34. The relay 34 is provided with an armature 35 which is connected over lead 36 to terminal 28 of the adapter. A further fixed contact 37 is associated with the relay 34 and connected to the output of a modulator 38 whose input is connected to terminal 26. The modulator includes a source of carrier signal at a frequency of $F_0$ on which the incoming intelligence received from terminal 26 is modulated to produce a low frequency carrier wave at the contact 37. A suitable frequency for the carrier used by the modulator 38 is 12,000 Hertz. As shown in FIG. 3, the relay 34 is de-energized and its armature 35 establishes a through connection from terminal 26 to terminal 28.

A through connection is also established from terminal 27 to terminal 29 by way of a lead 39, which interconnects terminal 27 with the armature 40 of a relay 41, and a fixed contact 42 of relay 41 which is connected by lead 43 to terminal 29. A demodulator 44 for demodulating low frequency carrier signals having a carrier frequency equal to the frequency of the carrier employed by modulator 38, is connected between the terminal 29 and a second fixed contact 45 of relay 41. As shown, relay 41 is de-energized. The outgoing call section of the adapter, shown within the broken line box 46, includes a selective detector 47 responsive to signals having a frequency of $F_1$. The detector 47 is essentially a signal control switch which is normally open circuited but which closes a circuit shown by the phantom outline in response to a signal received over the lead 48. The output from the detector which is controlled by the switch is obtained between ground and the lead 49 which is connected to a fixed contact 50 of a relay 51. The relay 51 controls a first armature 52 cooperating with a fixed contact 50 and a second fixed contact 53. Relay 51 also controls an armature 54 which cooperates with a fixed contact 55. As shown in the de-energized condition, the armature 52 engages contact 50 while the armature 54 is disengaged from contact 55. Current for operating the relay 51 is obtained from a negative voltage source connected to a terminal 56. The other side of the relay 51 is connected to ground through a bypass capacitor 57 and to the armature 52 through a resistor 58.

Relay contact 53 is connected through a first rectifier 59 to a common lead 60. The relay contact 55 is connected through a second rectifier 61 to the same lead 60. Rectifiers 59 and 61 are poled as shown in the drawing with the two cathodes joined to lead 60.

The incoming call section of the adapter shown within the broken line box 62 includes an oscillator 63 for producing a signal having a frequency of $F_1$. The output of the oscillator 63 is connected to the armature 64 of a relay 65 which cooperates with a fixed contact 66 connected to the terminal 28 and to lead 36. One end of the winding of relay 65 is connected to the voltage terminal 67 and the other end of the winding is connected through a timer 68 to a lead 69.

The incoming call section 62 also includes a selective detector 70 arranged to respond to signals having the frequency $F_0$. The detector 70 may be similar to detector 47, having an input control line 71 and an output line 72. The line 72 connects to one side of relay 41, the other side of relay 41 being connected to the positive voltage terminal 73. As shown diagrammatically in the drawing, the lead 72 is connected to ground when the selective detector 70 is energized by a suitable signal of frequency $F_0$ over lead 71.

The adapter also includes a mode and reset section designated generally by the reference numeral 74 which section includes a call completion relay 75, an incoming call relay 76, and an outgoing call relay 77. It also includes a relay 78 controlled by the M lead signal received at terminal 31 and a relay 79 controlled by the E lead signal received at terminal 30.

Relay 75 controls three sets of contacts 80, 81 and 82 which are all open when the relay is de-energized. Relay 76 controls normally open contacts 83, normally closed contacts 84, normally open contacts 85, and normally open contacts 86. Relay 77 controls normally closed contacts 87, and three sets of normally open contacts 88, 89 and 90. Relay 78 controls five sets of contacts 91, 92, 93, 94 and 95 of which the contacts 93 are normally closed, while the contacts 91, 92, 94 and 95 are normally open. Similarly, relay 79 controls five sets of contacts 96, 97, 98, 99 and 100 of which the contacts 96 are normally closed, while contacts 97, 98, 99 and 100 are normally open.

As seen in the drawing, when the appropriate relay contacts are closed, a circuit exists from the terminal 101 which is connected to the source of positive voltage through the winding of relay 76 and the relay contacts 87 to a junction 102 between contacts 83 and 96. Proceeding from junction 102, a circuit can be traced through contacts 96 and 91 to ground. Similarly, from junction 102, a circuit can be traced through contacts 83 and both contacts 92 and 97 in parallel to ground.

A circuit for relay 77 can be traced from terminal 103, which is connected to the source of positive voltage, through the winding of the relay and contacts 84 of relay 76 to a junction 104 between relay contacts 88 and 93. One path can be traced from junction 104 through contact 88 and relay contacts 94 and 99 in parallel to ground. Another circuit can be traced from junction 104 through relay contacts 93 and 98 in series to ground. A circuit for relay 75 can be traced from terminal 105 which is connected to the voltage source through the winding of the relay and relay contacts 100 and 95 in series to ground. It will be observed that lead 48 from the detector 47 is connected through the relay contacts 90 to a junction 106 between relay contacts 82 and 86. One path from junction 106 leads through relay contacts 82 to lead 43 and terminal 29. Another path from junction 106 leads through relay contacts 86 to the lead 71 connecting with detector 70. The lead 60 from the rectifiers 59 and 61 is connected through relay contacts 89 and 80 to ground. Finally, the lead 69 from the timer 68 is connected through relay contacts 85 and 81 to ground.

The operation of the circuit of FIG. 3 can now be described. Assuming that the adapter is functioning in conjunction with a call originating on the side connected to terminals 26 and 27 and heading for a destination connected to terminals 28 and 29 such that the adapter is operating as an outgoing call section with respect to the 2-wire central office switching circuit, a signal will first appear at terminal 30 from the E lead out of the signal circuit in the 4-wire terminal set and no signal appears at terminal 31 of the M lead. This will energize relay 79 closing contacts 97, 98, 99 and 100 and opening contacts 96 while relay 78 remains de-energized. When contacts 98 close, a circuit is completed from ground therethrough and through contacts 93, junction 104, and closed contacts 84 to energize relay 77. This is the outgoing call relay which, when energized, will close contacts 88, 89 and 90. Closure of contacts 88 completes a holding circuit for relay 77 through the closed contacts 99. In addition, operation of relay 77 opens contacts 87 to prevent subsequent operation of the incoming call relay 76. Closure of contacts 89 and 90 prepares circuits to the selective detector 47 and to the relay 51 for a purpose to be described.

The signal on the E lead appears, in known fashion, at the beginning of call initiation. When the call is completed, that is, when the switching is completed to establish a circuit through the 2-wire central office, a signal will also appear on the M lead at terminal 31. This will now energize relay 78, closing contacts 91, 92, 94 and 95 while opening contacts 93. The relay 79 remains energized due to the E lead signal. Thus, call completion relay 75 is energized through now closed contacts 95 and 100. Energization of relay 75 closes contacts 80, 81 and 82. This serves to complete a stand-by circuit from ground through contacts 80 and 89 to the lead 60 and prepares circuits to selective detector 70 and timer 68.

If the central office switching circuit 10 has sought out and connected the far end to other than a 4-wire circuit provided with an adapter 25, no further circuit operation will take place and communication will proceed in a conventional manner. That is, communication will proceed over the receiving path from terminal 26 via the direct connection established through contacts 33 and 35 of relay 34 to terminal 28. Similarly, the communication over the sending path will be from terminal 29 through closed contacts 42 and 40 of relay 41 to the terminal 27.

However, assuming that the switching circuit 10 makes contact with a 4-wire circuit provided with an adapter as shown in FIG. 2, then the incoming call section of that adapter will be activated. The operation can be followed by recognizing that at the start of the call connection a signal will appear on the M lead to energize the relay 78 and will appear subsequently on the E lead to energize relay 79. With relay 78 being energized before relay 79, the incoming call relay 76 will be energized over a path traceable from the terminal 101 through the winding of relay 76, closed contacts 87, junction 102, closed contacts 96 and 91 to ground. When relay 76 is energized contacts 83, 85 and 86 are closed while contacts 84 are opened, the latter barring operation of relay 77. At the time the call connection is completed, relay 79 will be energized completing a circuit for the call completion relay 75 through now closed contacts 95 and 100.

When relay 75 is energized it causes its contacts 80, 81 and 82 to close. Since relay contacts 85 and 86 have previously been closed by energization of the incoming call relay 76, a circuit will now be completed over lead 69 from ground to the timer 68. This energizes relay 65 for a predetermined short interval. Energization of relay 65 causes its armature 64 to engage contact 66 establishing a connection between the oscillator 63 and the terminal 28. This feeds a signal having a frequency of $F_1$ back through the 2-wire central office switching circuit to the adapter on the outgoing call side.

Returning now to the adapter on the outgoing call side, it will be remembered that the outgoing call relay 77 is energized causing its contacts 89 and 90 to be held closed. The signal at frequency $F_1$ which has been fed back from the adapter on the incoming call side is received at the adapter on the outgoing call side at terminal 29 and follows a path through closed contacts 82 of relay 75 to junction 106 and then through closed contacts 90 of relay 77 over lead 48 to the input of the selective detector 47.

The detector 47 responds to the signal causing its contacts to close completing a circuit from ground through lead 49, contact 50 of relay 51, armature 52 thereof, resistor 58, the winding of relay 51 to the terminal 56. This causes relay 51 to be energized attracting its armatures 52 and 54. The capacitor 57 ensures that the armatures 52 and 54 will make contact with contacts 53 and 55 of the relay 51. When this occurs, a holding circuit is completed from armature 52 through contact 53, rectifier 59, lead 60, now closed contacts 89 of relay 77 and now closed contacts 80 of relay 75 to ground. This circuit remains closed until the call completion relay 75 is released when the call is over and the connection is interrupted.

When armature 54 of relay 51 engages contact 55, a circuit is completed for relay 34 through rectifier 61 and lead 60 to ground via closed contacts 89 and 80. Relay 34 is now energized from voltage source 34a, causing its armature 35 to transfer from contact 33 to contact 37 placing the modulator 38 in series with the lead 36 and terminals 26 and 28. When this occurs a signal at the frequency of $F_0$ is applied by the modulator 38 (this may be the carrier frequency produced therein) to the lead 36 and out through terminal 28 to the 2-wire circuit interconnecting the outgoing call adapter with the adapter on the other side of the switching circuit.

Now considering the adapter on the other side of the switching circuit which is responding to an incoming call, it may be remembered that its relay 76 is energized along with its relay 75. Hence, the selective detector 70 in the incoming call section is connected through lead 71, closed contacts 86, junction 106, closed contacts 82 to the lead 43 between terminals 27 and 29. The signal at a frequency of $F_0$ introduced by the modulator on the outgoing call side of the switch connection is received at terminal 29 and detected by the detector 70. When this occurs a circuit is closed by the detector for energizing relay 41 which causes armature 40 to transfer from contact 42 to contact 45. This action places the demodulator 44 in series between terminals 27 and 29.

In summary, it will be seen that when an incoming call is received by a 4-wire circuit having an adapter 25, the adapter first applies a signal at a frequency $F_1$ which is sent back to the circuit on the originating side of the call. If the circuit on the call originating side is also provided with an adapter, it inserts a modulator in the receiving path which feeds a second signal at a different frequency, the frequency $F_0$, back to the adapter on the incoming call side, in order to confirm that adapters are on both sides of the switch and causing the demodulator to be inserted on the incoming call side. Both adapters are identical. When the adapter is on the outgoing side, with respect to call origination, the outgoing call section 46 functions. When the adapter is on the incoming side with respect to a call, the incoming call section 62 responds. Thus, the communication traffic going from the side on which the call originated to the destination side passes through the 2-wire switching circuit on a carrier signal applied thereto on the outgoing side and removed therefrom on the incoming side. The traffic in the reverse direction remains unchanged with respect to frequency and is communicated over a direct conventional connection.

If conditions are such that two 4-wire circuits are interconnected through a 2-wire switch with only one or none of the 4-wire circuits having an adapter, no adapter will be rendered operative. If the adapter is only on the outgoing call side, it will not receive a signal at the frequency $F_1$ from the far side and, hence, will not insert the modulator 38. On the other hand, if the adapter is only on the incoming call side, while it will briefly apply the output from oscillator 63 to the line, it will not insert the demodulator 44 since it will not receive a signal at the frequency $F_0$ to actuate the detector 70.

While various frequencies may be employed, a convenient carrier frequency, $F_0$, is 12,000 Hertz. Frequency $F_1$ may be of some other distinguishable audio magnitude.

Figure 4:
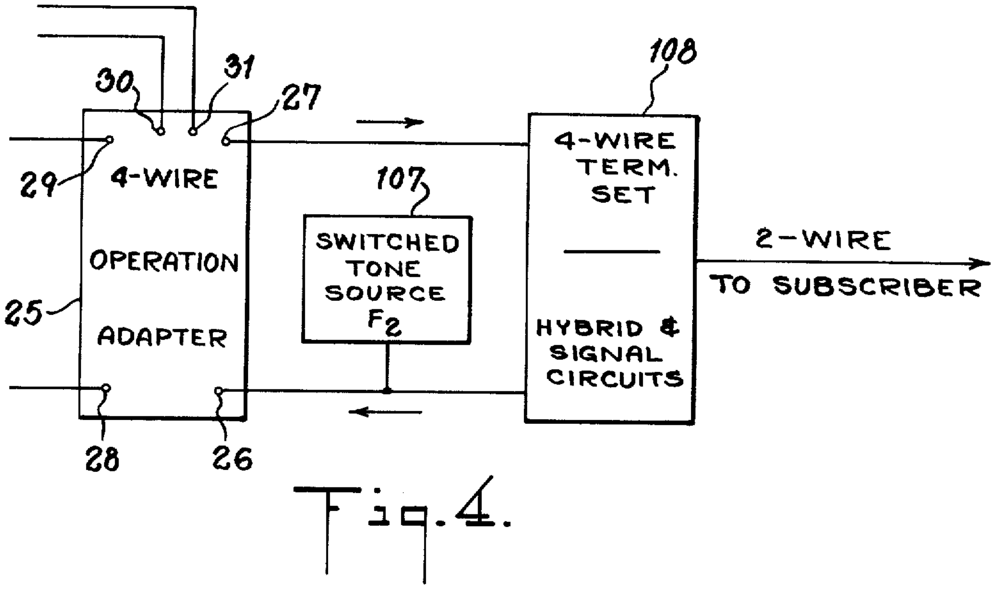
FIG. 4 is a fragmentary block diagram showing a modification applicable to an extension of the circuit of FIG. 2.

In connection with calls covering long distances through several 2-wire switching networks interposed between a series of separate 4-wire circuits, it may be desirable to afford some control to the destination circuit as to whether or not the intervening adapters are brought into operation. For this purpose, a separate tone source 107 having a different frequency, such as the frequency $F_2$, from the other frequencies used in the system, may have its output connected to the path leading to adapter terminal 26 in the final 4-wire circuit such as shown in FIG. 4. As used above, the expression "final 4-wire circuit" refers to those 4-wire circuits which may be connected as the destination terminal circuit in an extended network. Tone source 107 may be either automatically switched into the circuit or may be externally controllable. In either case, the signal $F_2$ will be applied to the aforesaid path, nominally referred to as the "receiving path," and fed back toward the originating end of the call when the call connection is completed. As seen in FIG. 4, the sending and receiving paths are connected through a 4-wire terminal set 108 to a 2-wire circuit leading to a subscriber. In the case of circuit 108 the hybrid circuit can be specifically balanced for the 2-wire circuit.

Figure 5:
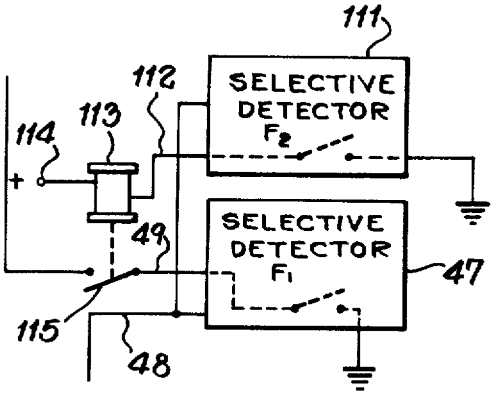
FIG. 5 is a fragmentary block diagram showing a modification of the circuit of FIG. 3.

If the tone source 107 is used in the system, then the adapters are modified as shown in FIG. 5 to include the selective detector 111 responsive to the frequency $F_2$ for completing a circuit over lead 112 for the relay 113 which has the other side of its winding connected to the positive voltage terminal 114. Relay 113 controls normally open relay contacts 115 connected in series in the lead 49 shown in FIG. 3 between the points 116 and 117 designated by the "X" symbols. It should be appreciated that so long as relay 113 is de-energized the relay 51 cannot be actuated. Hence, modulator 38 in FIG. 3 will be inserted in the line 36 only in response to receipt by the outgoing call section 46 of the adapter of both tone signals, one at frequency $F_1$ and the other at frequency $F_2$.

Figure 6:
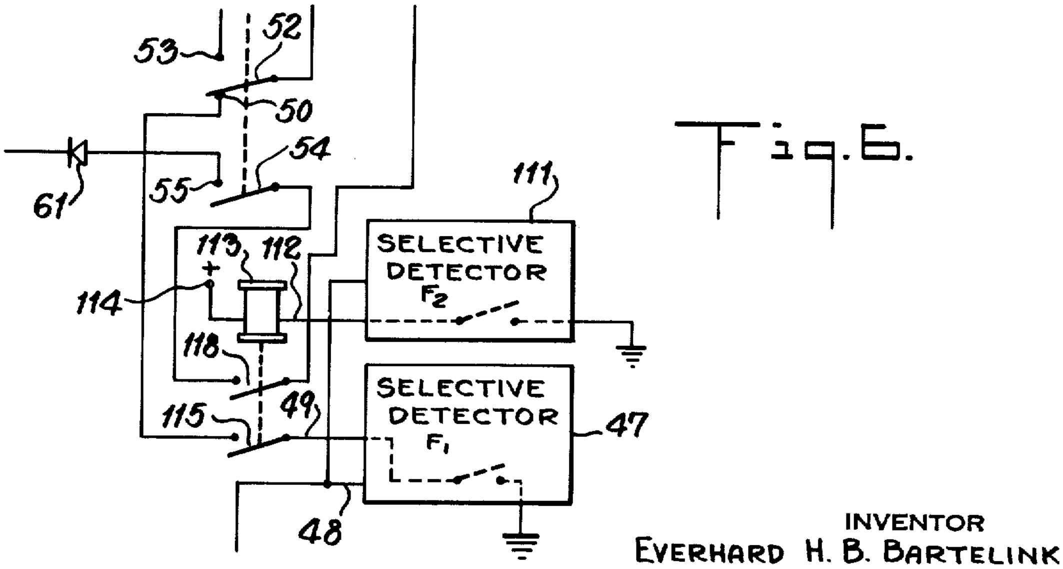
FIG. 6 is a view similar to FIG. 5 showing a further modification of the circuit of FIG. 3.

It may also be desirable to enable the party at the destination side of the call to remove the adapters effectively from the circuit. For this purpose the circuit of FIG. 3 may be further modified as shown in FIG. 6 by providing the relay 113 with an additional set of contacts 118 connected between points 119 and 120 in FIG. 3 in series between armature 54 and relay 34. With the modification of FIG. 6, the adapters will be caused to function only so long as the signal at the frequency $F_2$ is present in the circuit. As soon as this signal is interrupted, the adapters will be de-energized and will then remain out of the circuit.

It should be understood that for those cases where it is mandatory to maintain 4-wire operation throughout the entire connection, special numbers may be assigned in a telephone system which, when dialed, connect the outgoing call only to those groups of trunks which are equipped with the 4-wire adapters. It should be noted that even for calls on which 4-wire operation can be provided for only part of the way, a considerable improvement in transmission can be obtained. The same basic techniques which have been described above for switching centers may also be used to provide 4-wire operation over certain other types of 2-wire circuits.

While the control tone $F_0$ has been inserted in the line by using the carrier signal from the modulator 38, it is possible to employ a separate tone generator to be connected to the line 36 along with the modulator. In such case the tone used for the signalling must be distinguishable from the carrier frequency employed by the modulator in order that the tone will be excluded or rejected by the demodulator at the opposite end of the 2-wire circuit.

It should also be apparent that the frequencies $F_1$ and $F_0$ need not be the same at all switching locations because the function performed by each of the control signals is strictly local in nature. All that is required is that the two adapters on opposite side of a 2-wire network be compatible.

In the above description, it has been assumed that E and M signalling, as commonly encountered in carrier systems, is used. When other types of signals are used in the circuit they can generally be translated into E and M signals.

For the sake of simplicity in describing the switching logic of the above system, electromechanical relays have been used in the specific examples. However, solid state logic circuits can readily be substituted for the functions described above in known manner. Various other changes in construction may occur to those skilled in the art without departing from the true spirit of the invention as defined in the appended claims.

What is claimed is:

1. A method of providing effective 4-wire operation through a 2-wire communication circuit upon connecting the same between a pair of 4-wire communication circuits, which comprises the steps of: connecting said 2-wire circuit between a first and a second 4-wire circuit, and upon said connection, sending a control signal from each of said 4-wire circuits, to the other through said 2-wire circuit, detecting at each of said 4-wire circuits, the control signal sent thereto, in response thereto modulating on a local carrier the intelligence signal received in the receiving path of the first of said 4-wire circuits to form a modulated carrier wave signal, transmitting said modulated signal over said 2-wire circuit to the second said 4-wire circuit and demodulating the same in the transmitting path thereof to recover said intelligence signal, and transmitting the intelligence signal received in the receiving path of said second 4-wire circuit over said 2-wire circuit to the transmitting path of the first said 4-wire circuit.

2. A method according to claim 1, wherein said control signals are sent and detected, by transmitting a first said control signal from said second 4-wire circuit to the first said 4-wire circuit, and detecting said first control signal thereat, thence causing the second said control signal to be transmitted from said first to said second 4-wire circuit and detecting the same thereat.

3. A method according to claim 2 wherein said second of said 4-wire communication circuits interconnects with one or more additional 4-wire circuits through additional 2-wire switching circuits, and wherein an audio control signal is sent from the last of said additional 4-wire circuits to said first 4-wire circuit, and wherein said second control signal is transmitted from said first of said 4-wire circuits when both said control signal and said audio control signal are received at said first 4-wire circuit.

4. A method according to claim 2 wherein said first control signal is sent upon completion of said interconnection between said two 4-wire communication circuits and then transmitting said first control signal in response to said completion of the interconnection.

5. A method according to claim 4 wherein said first control signal is transmitted for a relatively short interval, and the modulating of the intelligence signal in the receiving path of said first 4-wire communication circuit is continued until said interconnection is terminated.

6. A method of interconnecting a first and a second 4-wire circuit through a 2-wire interconnecting circuit in which at least the first of said 4-wire circuits is equipped with an adapter for transmitting a local carrier through said 2-wire circuit to said second 4-wire circuit, said method comprising: upon completion of said interconnection, the transmission from said second to said first 4-wire circuit of a first control signal if said second circuit is equipped with such an adapter, and upon receipt and detection of said first control signal by said first circuit, said first circuit switches in its said local carrier and applies the signals received on the first 4-wire circuit as a modulation signal thereto which is transmitted to said second circuit, upon receipt of which said second circuit switches in a circuit for demodulating said signal.

7. A method according to claim 6 wherein said first circuit upon switching in its local carrier, also transmits a second control signal to said second circuit, upon receipt of which second control signal the second circuit switches in a circuit for demodulating the signals received from said first circuit.

8. An adapter for installation between a 4-wire communication circuit and a 2-wire telephone switching circuit comprising: an outgoing call section for transmitting intelligence signals in the receiving path of said 4-wire communication circuit on a local carrier through said 2-wire telephone switching circuit, an incoming call section for recovering intelligence signals from a local carrier wave transmitted to the sending path of said 4-wire communication circuit from said 2-wire telephone switching circuit, and call mode control circuit means responsive to signals indicative of the direction of a call for connecting said outgoing or incoming call section between said 4-wire communication circuit and said 2-wire telephone switching circuit, respectively, when a call proceeds from or to said 4-wire circuit to or from said 2-wire circuit.

9. An adapter as in claim 8 wherein said outgoing call section comprises detecting means associated with the sending path of said 4-wire communication circuit for detecting a first control signal, and modulating means associated with the receiving path of said 4-wire communication circuit and responsive to said detecting means for detecting said first control signal for modulating intelligence signals thereat on a local carrier wave for passage through said 2-wire telephone switching network.

10. An adapter as in claim 9 wherein said modulating means is coupled in the receiving path by switching circuit means which is arranged to bypass said modulating means in the absence of receipt of said first control signal by said detecting means.

11. An adapter as in claim 10 wherein said switching circuit means is coupled to said detecting means by a switching control means which is responsive to said detecting means.

12. An adapter as in claim 11 and further comprising audio detecting means associated with the sending path of said 4-wire communication circuit for detecting a predetermined audio control signal, and a first switch means responsive to said audio detecting means for connecting said detecting means to said switching control means.

13. An adapter as in claim 12 and further comprising second switch means responsive to said audio detecting means for connecting said switching control means to said switching circuit means.

14. An adapter as in claim 13 wherein said switching control means is responsive to said call mode control circuit means and is arranged to maintain control over said switching circuit means when said 4-wire circuit is interconnected for 4-wire operation through said 2-wire switching circuit and after said first control signal is terminated.

15. An adapter as in claim 14 wherein said outgoing call section includes control tone generator means associated with the receiving path of said 4-wire communication circuit for transmitting a second control signal.

16. An adapter as in claim 15 wherein said last mentioned control tone generator means includes said modulating means.

17. An adapter as in claim 8 wherein said incoming call section comprises detecting means associated with the sending path of said 4-wire communication circuit for detecting a control signal, and demodulating means associated with said sending path and responsive to said detecting means detecting said control signal for demodulating intelligence signals on a local carrier wave transmitted to said 4-wire communication circuit from said 2-wire telephone switching circuit.

18. An adapter as in claim 17 wherein said demodulating means is coupled to said sending path by switching circuit means responsive to said detecting means and arranged to bypass said demodulating means in the absence of detection of said control signal.

19. An adapter as in claim 17 wherein said incoming call section includes tone control generating means associated with the receiving path of said 4-wire communication circuit for transmitting another control signal.

20. An adapter as in claim 19 wherein said tone control generating means comprises a tone oscillator and a switch means arranged to couple said tone oscillator into the receiving path.

21. An adapter as in claim 17 wherein said incoming call section comprises generating means for selectively applying an audio tone to the receiving path of said 4-wire communication circuit.

22. Method according to claim 6 in which said 2-wire circuit consists of a switching device by means of which one of the 4-wire communication circuits can be connected to one of a group of other 4-wire communication circuits.

23. A method according to claim 6 wherein the first 4-wire circuit is associated with the call-originating end of the overall circuit and the second 4-wire circuit is associated with the call receiving end of the overall circuit.

* * * * *